Patented Nov. 21, 1922.

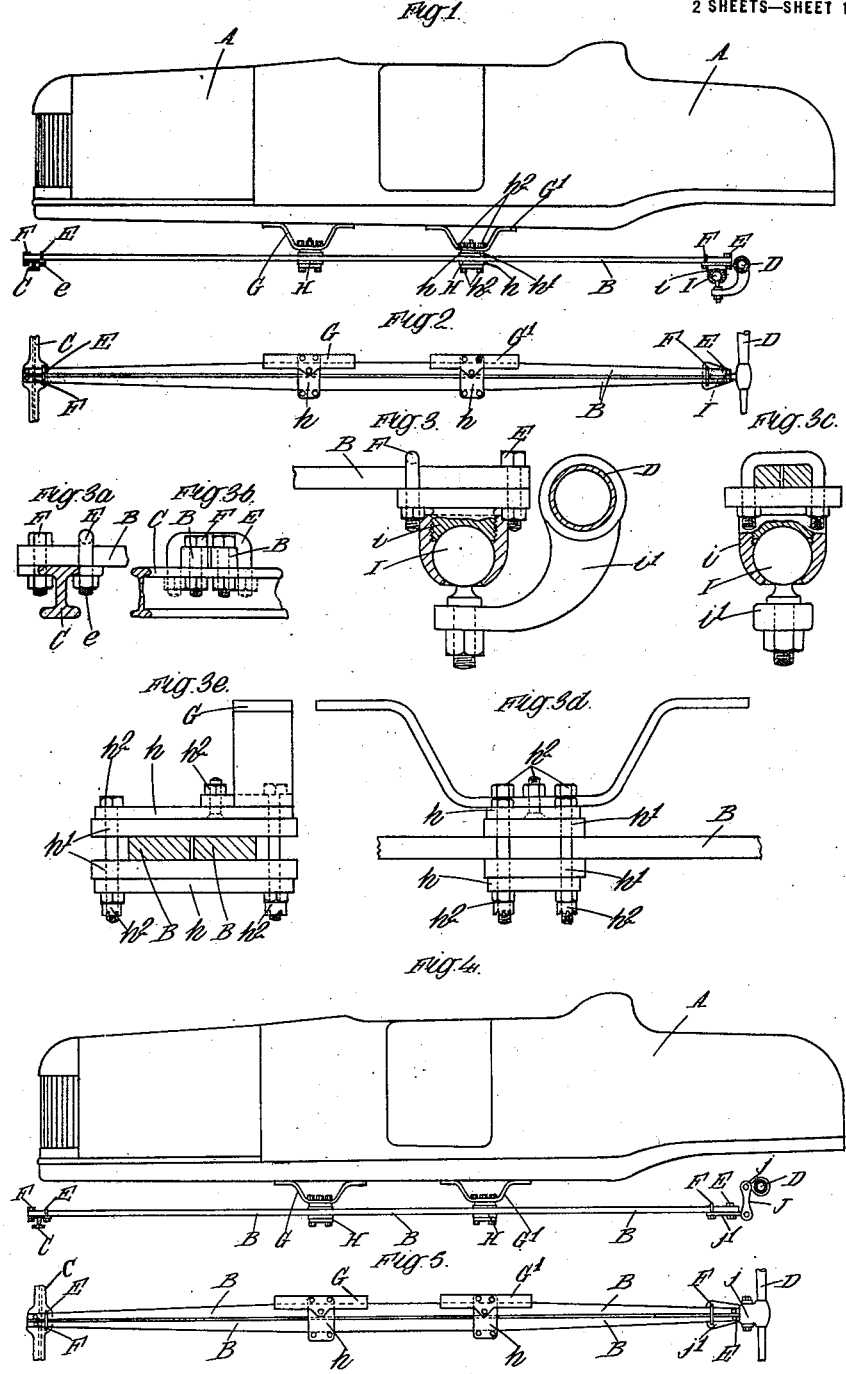

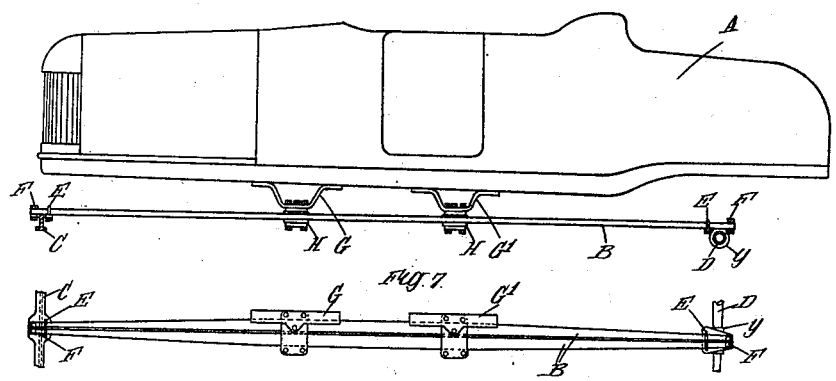
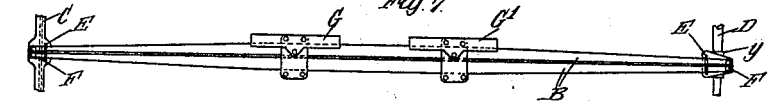
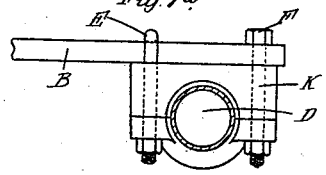
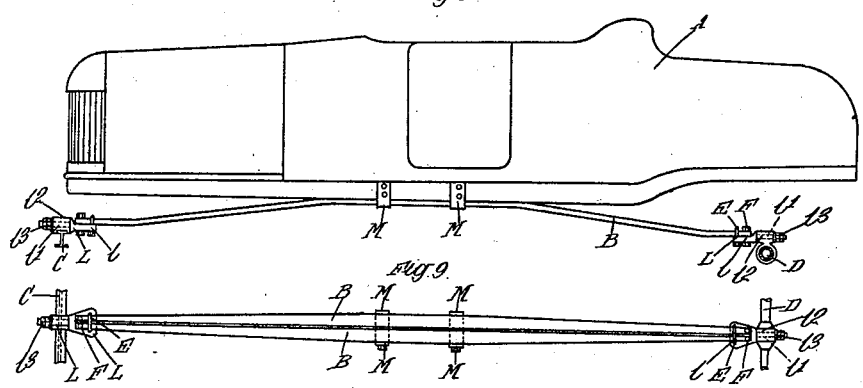

1,435,915

UNITED STATES PATENT OFFICE.

LEONARD EUGENE COWEY, OF KEW GARDENS, ENGLAND.

SPRING SUSPENSION OF MOTOR ROAD VEHICLES.

Application filed March 7, 1921. Serial No. 450,246.

*To all whom it may concern:*

Be it known that I, LEONARD EUGENE COWEY, a subject of the King of Great Britain, residing at Archer Works, Station Avenue, Kew Gardens, in the county of Surrey, England, have invented certain new and useful Improvements in or Relating to Spring Suspension of Motor Road Vehicles, of which the following is a specification.

This invention relates to motor road vehicles of the kind in which the frame or chassis is resiliently supported by long leaf springs which are disposed on opposite sides of the frame or chassis with their extremities attached to the front and rear axles respectively.

According to one feature of the present invention each spring is also connected at two points between the ends thereof to the frame or chassis, one or both of said connections to the frame or chassis comprising rubber or equivalent resilient or flexible material by which the spring is supported in a resilient manner so as to permit of a limited amount of movement of the springs relatively to the frame or chassis. In the case of non-laminated springs the ends thereof may be rigidly connected to the front and rear axles respectively, but in the case of laminated springs one of the aforesaid connections to the axle is preferably also of a flexible character and may be constituted, for example, by a journal bearing, a ball and socket joint, or by toggle links, said flexible connection being preferably located at the rear axle of the car. In cases where only one of the aforesaid connections to the frame or chassis comprises resilient or flexible material, the other connection may by constituted by a ball and socket joint or by a sliding or equivalent joint.

According to a further feature of the present invention and in the case of springs constituted by non-laminated or solid bars the extremities thereof are attached to the front and/or rear axles respectively in a flexible or pivotal manner and each spring is also connected between the ends thereof to the frame or chassis, either by rigid connecting means or by connecting means of a non-rigid or flexible character.

In order that the said invention may be clearly understood and readily carried into effect the same will now be described more fully with reference to the accompanying drawings in which:—

Figure 1 is a partly diagrammatic elevation of a light car fitted with one constructional form of the invention.

Figure 2 is a plan showing a set of the springs at one side of the vehicle.

Figures 3, 3ª, 3ᵇ, 3ᶜ, 3ᵈ, 3ᵉ, show on a larger scale certain parts of the device shown at Figures 1 and 2.

Figures 4, and 5, 6 and 7, and 8 and 9 are views corresponding to Figures 1 and 2, but showing alternative constructional forms of the invention and Figure 7ª is a detail view showing a further modification of the arrangement shown at Figures 6 and 7.

A is the body of the vehicle and B, B are the long leaf springs which are tapered (in plan) towards each of their extremities and mounted together in pairs and disposed on the opposite sides of the vehicle with their ends attached respectively to the front axle C and the rear axle D. In the examples shown at Figures 1 to 7 each pair of springs B, B is held in position and also connected to the axle C by means of a U-shaped member E which is disposed over the springs and the ends thereof passed through openings in the axle C, the parts being secured together by means of nuts $e, e$. Bolts and nuts F, F are also provided for securing the front ends of each spring to the axle C.

In the examples shown at Figures 1 to 7ª the long leaf springs are also secured to the body of the vehicle A at two points between the ends thereof by means of brackets G, G', which are bolted or otherwise secured to the chassis and which carry the resilient supports H, H for the long leaf springs B, B. The said resilient supports H, H are constituted by upper and lower metal plates $h, h$, between which plates $h', h'$, composed of rubber or like resilient material are located, the springs B, B being located side by side between the resilient plates $h', h'$ and the various parts secured together by bolts and nuts $h^2, h^2$.

In the embodiment of the invention shown at Figures 1 and 2 the rear ends of the springs are indirectly connected to the axle D through the intermediary of a ball and socket connection I, the socket part $i$ thereof being secured to the ends of the springs B, B in a similar manner to that by which the front ends of the springs are attached to the axle C, and the ball part thereof being carried by a curved bracket $i'$, connected to the rear axle D. Owing to this arrangement the part of each leaf spring B which is located between the front axle C and the front resilient connection G acts both as a radius and torque rod while the rear part of the spring between the connection G' and the rear axle D acts as a radius rod.

In the embodiment of the invention shown at Figures 4 and 5 the rear end of each leaf spring B is secured to the axle D through the intermediary of a pair of toggle links J, J, the ends of which are pivotally connected to a flanged collar $j$ on the axle D and the other ends of which are pivotally connected to a plate $j'$ which is attached to the rear ends of the springs B, B. This arrangement is intended for use in cases where the rear axle of the car is equipped both with radius and torque rods. In the arrangement shown at Figures 6 and 7 the rear ends of the springs B, B are rigidly connected to the rear axle by means of a flanged collar $y$ which is secured to the axle D and to which the ends of the springs B, B are attached by means of bolts and nuts F and U-shaped members E. Owing to the fact that the connection to the front and rear axles is of a rigid character the front and rear ends of the springs act both as radius and torque rods. In the modified arrangement shown at Figure 7a the rear ends of the springs B, B are secured to the axle D through the intermediary of a journal bearing K so that the rear ends of the springs are free to move or turn to a limited extent relatively to the axle D. In this case the front ends of the springs act both as radius and torque rods, while the rear ends act only as radius rods.

In the arrangement shown at Figures 8 and 9 the front and rear ends of the springs are secured to the axles C and D through the intermediary of pivotal connections L, L each of said pivotal connections being constituted by plates $l, l$ connected as shown to the front and rear ends of the springs respectively, and provided with a reduced part $l'$ which is rotatably mounted within a collar $l^2$ secured to the axle, the parts being held together by means of nuts $l^3, l^3$, which engage screw threads on the ends of the part $l'$.

In this case the springs B, B are rigidly secured at two points between the ends thereof to the frame or chassis A through the intermediary of U-shaped members M, M. Owing to this arrangement both ends of the springs are free to turn so as to allow the springs to accommodate themselves to, or to take up, twisting movements transmitted along the length thereof. In this case both ends of the springs act as radius and torque rods, so that there is no necessity to provide separate torque or radius rods, but this arrangement as well as that shown at Figures 6 and 7 is only suitable for use in cases where the spring is constituted by a solid or non-laminated bar.

Although the invention has been described with reference to constructional forms of the invention in which the springs have been constituted by non-laminated or solid bars it is to be understood that in cases where a pivotal connection is provided either at the front or rear axle, springs of the laminated type could be employed, that is to say, the examples described with reference to Figures 1 to 5, as also the modification shown at Figure 7a, are suitable for use both in cases where the springs are constituted by non-laminated or solid bars, and also in cases where laminated springs are employed.

What I claim and desire to secure by Letters Patent of the United States is:—

1. In a motor road vehicle the combination with a chassis of long springs disposed on opposite sides of the chassis, means attaching one end of each of said springs to the front axle, means attaching the other end of each of said springs to the rear axle, rigid supporting means connecting each of said springs between the ends thereof to the chassis, and elastic and flexible material interposed between said springs and said rigid supporting means so as to permit of a limited amount of movement of the springs relatively to said rigid supporting means for the purpose specified.

2. In a motor road vehicle the combination with a chassis of long springs disposed on opposite sides of the chassis, flexible means attaching one end of each of said springs to the front axle, flexible means attaching the other axle, and resilient means comprising elastic and flexible material connecting each of said springs at two points between the ends thereof to the chassis so as to permit twisting movements to be transmitted from end to end of the springs for the purpose specified.

3. In a motor road vehicle the combination with a chassis of long springs disposed on opposite sides of the chassis, means attaching one end of each of said springs to the front axle, means attaching the other end of each of said springs to the rear axle, one of said attaching means being of a flexible character, rigid supporting means connecting each of said springs at two points between the ends thereof to the chassis, and elastic and flexible material interposed between said rigid supporting means and said springs so as to permit of a limited amount of movement of the springs relatively to the chassis.

4. In a motor road vehicle the combination with a chassis of a multiplicity of long leaf springs each constituted by a continuous non-laminated or solid bar, said springs being disposed on opposite sides of the chassis, means attaching one end of each of said springs to the front axle, means attaching the other end of each of said springs to the rear axle, rigid supporting means connecting each of said springs at two points between the ends thereof to the chassis, and elastic and flexible material interposed between said rigid supporting means and said springs so as to permit of a limited amount of movement of the springs relatively to said rigid supporting means.

5. In a motor road vehicle the combination with a chassis of a multiplicity of long leaf springs each constituted by a continuous non-laminated or solid bar, said springs being disposed on opposite sides of the chassis, flexible means attaching one end of each of said springs to the front axle, flexible means attaching the other end of each of said springs to the rear axle and means connecting each of said springs between the ends thereof to the chassis at two points, said means comprising rubber which permits of a limited amount of movement of the springs relatively to the chassis.

6. In a motor road vehicle the combination with a chassis of continuous long springs disposed on opposite sides of the chassis, means attaching one end of each of said springs to the front axle, means attaching the other end of each of said springs to the rear axle, rigid means connecting each of said springs between the ends thereof to the chassis at two points, and rubber interposed between said springs and said rigid connecting means permitting relative movement between said springs and said rigid connecting means.

7. In a motor road vehicle the combination with a chassis of continuous long springs disposed on opposite sides of the chassis, means attaching one end of each of said springs to the front axle, means attaching the other end of each of said springs to the rear axle, rigid means connecting said springs between the ends thereof to the chassis at two points, and rubber interposed between said springs and said rigid connecting means so as to allow twisting movements to be transmitted from end to end of the long springs.

8. In a motor road vehicle the combination with a chassis of continuous springs disposed on opposite sides of the chassis, means attaching one end of each of said springs to the front axle, means attaching the other end of each of said springs to the rear axle, rigid means connecting each of said springs to the chassis at two points, and rubber interposed between said rigid connecting means and said springs so as to allow of relative universal movement between said springs and said connecting means.

9. In a motor road vehicle the combination with a chassis of two leaf springs each constituted by a continuous non-laminated or solid bar, said springs being disposed on opposite sides of the chassis, means attaching one end of each of said springs to the front axle, means attaching the other end of each of said springs to the rear axle, rigid connecting means attaching each spring between the ends thereof to the chassis, and rubber interposed between said springs and said rigid connecting means permitting a relative universal movement between said springs and said connecting means.

LEONARD EUGENE COWEY.